J. L. SILSBEE.
METHOD OF RECOVERING POTASSIUM CHLORID FROM BRINE.
APPLICATION FILED OCT. 22, 1919.
1,353,283.
Patented Sept. 21, 1920.
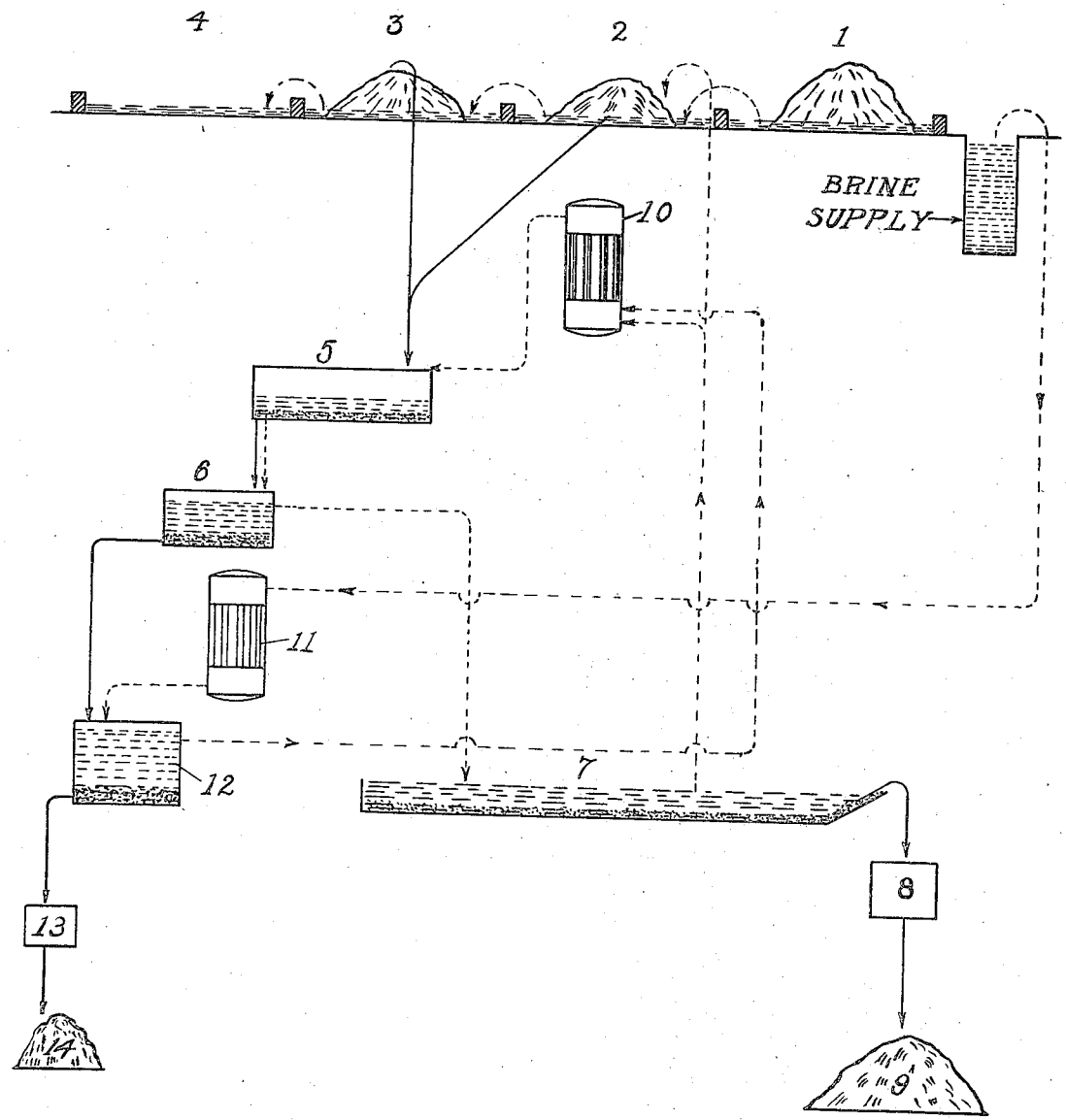
Joseph L. Silsbee INVENTOR
BY
Geo. B. Willcox ATTORNEY

UNITED STATES PATENT OFFICE.

JOSEPH L. SILSBEE, OF SALT LAKE CITY, UTAH.

METHOD OF RECOVERING POTASSIUM CHLORID FROM BRINE.

1,353,283.  Specification of Letters Patent.  Patented Sept. 21, 1920.

Application filed October 22, 1919. Serial No. 332,441.

*To all whom it may concern:*

Be it known that I, JOSEPH L. SILSBEE, citizen of the United States, residing at Salt Lake City, in the county of Salt Lake and State of Utah, have invented certain new and useful Improvements in Methods of recovering Potassium Chlorid from Brine; and I do hereby declare the following to be a full, clear, and exact description of the invention, such as will enable others skilled in the art to which it appertains to make and use the same.

My invention relates particularly to the treatment of certain natural deposits, such as brines or residues left by the evaporation of brines which coll ct in inland basins in the western States and which contain principally potassium, sodium and magnesium chlorid in varying proportions and degrees of concentration and frequently a small proportion of sulfate, probably chiefly as gypsum.

A typical brine adapted for treatment by this method may be of substantially the following composition:

| | | | |
|---|---|---|---|
| Sodium chlorid | 314 | grams per 1000 | grams of water. |
| Potassium chlorid | 23 | " " 1000 | " " " |
| Magnesium chlorid | 22 | " " 1000 | " " " |
| Calcium sulfate | 5 | " " 1000 | " " " |
| Magnesium sulfate | 3 | " " 1000 | " " " |

For the purpose of illustration, I will describe my improved method as applied to a brine of the above composition, although obviously it may be employed in the reduction of any brines capable of treatment by my improved method, such as brines containing sodium of about the same degree of concentration as the potassium and magnesium chlorid.

One object of my present invention is to provide a simple and inexpensive method of obtaining from brines of this character a crude crystalline material capable of being treated to yield high grade potassium chlorid.

A further object of my invention is to employ in refining such crude material, a method of recovering potassium chlorid wherein the cycle of operations is simplified, the process is cheapened and labor and material are saved.

The treatment of potash bearing brines containing principally potassium, sodium and magnesium chlorids has heretofore been as follows:

A large part of the sodium chlorid contents has been first crystallized out by solar evaporation. The residual liquor resulting from the first solar evaporation has then been removed and further concentrated at high temperature by steam evaporation, as in vacuum pans or grainers, or by direct fire evaporation in open pans, or both, thereby precipitating an additional quantity of sodium chlorid.

A sufficient amount of fuel and enough evaporating apparatus having large heating surface had to be employed to supply the latent heat of vaporization, and this constituted a most expensive step in the refining process.

After steam evaporation the resulting hot mother liquor containing practically all of the magnesium chlorid and potassium chlorid in the original brine was then cooled, thereupon depositing crystals of either potassium and sodium chlorids or carnalite, or a mixture of the two. From these crystals potassium chlorid was recovered by well known methods that entailed the use of quantities of cold fresh water for washing the product in order to dissolve and remove the sodium chlorid present as an impurity. To avoid the employment of steam or direct fire evaporation and to produce so pure a product that washing with cold water will not be necessary for commercial purposes, and to simplify and cheapen the entire process I have developed the following method which is diagrammatically illustrated in the accompanying drawing showing a typical flow sheet.

In the drawing, the arrows on the broken lines indicate the flow of liquor and the arrows on the solid lines indicate the path of travel of the solids.

1 represents the solar vats or ponds in which the brine is first evaporated and in which a large part of the sodium chlorid, if present in excess, is deposited. In this vat or series of vats, the crude brine is concentrated by solar heat to approximately one-fourth of its original volume, assuming the brine to be of substantially the composition previously given or to a degree of concentration such that further evaporation would cause a portion of the potassium chlorid content to be precipitated. During this first concentration the greater part of the calcium sulfate and about seventy-five per cent. of the sodium chlorid of the original brine are precipitated, leaving a solar mother liquor consisting essentially of sodium, potassium and magnesium chlorids, saturated at atmospheric temperatures with potassium and sodium chlorid.

The mother liquor is then transferred from the first vat into a second or crude-material vat, 2.

Here the mother liquor is further concentrated by solar evaporation to a condition where further evaporation will cause precipitation of a portion of the magnesium chlorid content. Such condition in the example mentioned will be reached when the mother liquor has evaporated to approximately forty-three per cent. of its volume as it came from the first vat, corresponding to about eleven per cent. of the volume of the original trench brine.

During this second solar concentration approximately seventy per cent. of the potassium chlorid content may be deposited as crystals, mixed with sodium chlorid and a small percentage of adhering magnesium chlorid liquor. This result is possible because of the relatively low proportion of magnesium chlorid present in this liquor.

I avoid precipitating magnesium chlorid, either as such, or as carnalite, so far as practicable, because the potassium chlorid content can be recovered at less cost from the sodium-potassium chlorid mixture than from crude carnalite containing the same percentage of potassium chlorid.

It should be noted that this applies within quite wide limits, and that it makes little difference whether the solar evaporation proceeds exactly to or beyond the point mentioned.

The potassium chlorid content can be recovered at less cost from this NaCl–KCl mixture than from a crude carnalite containing the same percentage of potassium chlorid.

After the mixed potassium chlorid and sodium chlorid salts are deposited as above described the liquor from vat 2 is preferably transferred to a third series of vats 3, although if local conditions make is advisable, vats 2 and 3 may be combined as a single vat. In vat 3 the liquor is further concentrated by solar evaporation to a point where practically all the remaining potassium is precipitated, that is to say, about twenty-eight per cent. of the original potassium chlorid content of the brine may be thrown down, together with about twenty-nine per cent. of the total magnesium chlorid, the two forming carnalite.

The residual liquor will then have a volume of approximately seven tenths of the volume of the mother liquor as it came from vat 2, or about two and one half per cent. of the volume of the original trench brine. This liquor may be disposed of by transferring it to another series of vats designated by numeral 4, which are magnesium storage vats, whence magnesium chlorid may be produced as a by-product.

The crude material for the refining process is principally the crystalline product of vat 2, the mixed salts of potassium chlorid and sodium chlorid, this material being in the most desirable form for subsequent treatment for the recovery of high grade potassium chlorid.

From vat 3, as above noted, some carnalite is obtained, but as previously mentioned, the major part of the potassium is contained in the mixed sodium and potassium salt resulting from the earlier stage or solar evaporation in vat 2.

If, however, vats 2 and 3 are united in a single vat as above suggested, the mixed salt will be recovered with the carnalite.

The crystals from vats 2 and 3 are harvested and transported to the refinery, always, however, endeavoring to obtain at the refinery a crude material containing as little magnesium chlorid as practicable. I have found that one way of reducing the magnesium chlorid content of the carnalite is to stack this carnalite in the solar vat where it is exposed during the rainy season. The cold rain water dissolves a part of the magnesium chlorid and returns it to the vat, thereby reducing the quantity of material to be treated as well as the magnesium chlorid percentage in this stacked material. Sufficient quantity of crude NaCl–KCl salts can be harvested in the fall to supply the requirements during the winter months, making the operation continuous throughout the year.

*Refining crude potassium chlorid salts.*

The crude crystalline material from the solar vats is first treated in a dissolver 5 with hot mother liquor from a later step in the process, preferably at a temperature above one-hundred degrees centigrade. The hot liquor dissolves practically all the solid potassium chlorid from the crude material and produces a solution saturated with potassium chlorid, leaving the solid sodium chlorid content undissolved.

The hot saturated potassium chlorid solution and the residual solid sodium chlorid may be transferred from the dissolver to a suitable separator 6, and there separated. The common salt obtained by this separation may be converted into a higher grade marketable product by washing with new hot brine. The washings may also be returned to the process, thereby recovering such potassium chlorid solution as adhered to the common salt as it came from the dissolver and recovering any solid potassium chlorid that may have escaped dissolving in 5, as will be described later.

The clear hot potassium chlorid liquor from separator 6 is delivered to suitable tanks 7 and there cooled, potassium chlorid being precipitated.

The potassium chlorid precipated in tanks 7 is separated from the cooled liquor and delivered to centrifugal filters 8 and thence to storage 9.

The cooled mother liquor is removed from tanks 7 and the greater part is diluted or tempered with respect to magnesium chlorid, as will presently be explained, passed through heaters 10 and re-used in dissolver 5. The smaller part of the liquor may be returned to solar vat 2, where its potassium content is ultimately recovered.

The high degree of efficiency attained in practice by this method of refining, is due to my making available the peculiar capacity possessed by magnesium chlorid brine below certain degreees of concentration, to dissolve potassium chlorid while hot, and when cooled to deposit practically pure potassium chlorid without depositing sodium chlorid, or magnesium chlorid, or carnalite as impurities.

Brine saturated with potassium chlorid and containing less than one-hundred-fifty grams magnesium chlorid per one-thousand grams of water will hold less sodium chlorid in solution at high temperatures, say, 83° C. than it will hold at low temperatures, say, 25° C.

The brine from dissolver 5 is at a temperature of about 83° C. and is saturated with respect to both potassium and sodium chlorids. By keeping its magnesium chlorid content below one hundred fifty grams per one-thousand grams of water, the brine upon cooling will precipitate potassium chlorid without depositing sodium chlorid. It will when cooled tend even to absorb more sodium chlorid.

If the degree of concentration with respect to magnesium chlorid were greater than one hundred fifty grams per one thousand grams of water, the liquor being saturated with potassium chlorid, it would tend upon cooling to deposit sodium chlorid together with potassium chlorid, which would produce a less pure potassium salt. Therefore, the liquor passing through the dissolver 5—being preferably the re-heated and recirculated mother liquor from cooler 7—is in my method continuously maintained at less than one hundred fifty grams magnesium chlorid per one thousand grams of water. Since any magnesium chlorid in the crude salts from vats 2 and 3 is readily soluble, it will be taken up by the hot solvent liquor in dissolver 5. Therefore, repeated re-use of the liquor would normally cause the magnesium chlorid to accumulate to excess in the solvent or circulating liquor. To keep the liquor below a detrimental degree of concentration in respect to magnesium chlorid, I remove the smaller part, say, about fifteen per cent. of the total volume of the cold liquor issuing from cooler 7 at each successive passage of the liquor through the system, and make up the removed volume with dilute brine. As previously stated, this make-up brine may be first used to wash the sodium chlorid that has been discharged from the separator 6.

The preferred method of washing the sodium chlorid delivered from separator 6 is as follows:

Cool brine or fresh water to the amount required is brought from the source of supply to a heater 11, and the heated liquor is delivered, together with the salt from separator 6 into the salt washer 12. The washed salt is removed and dried as in a centrifugal filter 13, which delivers commercially dry salt, 14.

The washings from the washer 12 and centrifugal filter 13 are weak in magnesium chlorid. They have also absorbed some potassium chlorid by contact with the material in washer 12. This wash liquor is then heated, as in a heater 10, and passes through the system along with the greater part, say, eighty-five per cent., of the liquor from cooler 7, as previously noted, the mixed liquor being below the prescribed limit of concentration with respect to magnesium chlorid.

The smaller part, or fifteen per cent. of the liquor from cooler 7, which was removed from the cycle and replaced by weak magnesium chlorid liquor as just described, contains about eight per cent. of the total potassium chlorid and is at approximately the same degree of concentration as the brine which is delivered from vat No. 1 to vat No. 2.

This removed liquor is, therefore, preferably discharged into vat No. 2, which is the principal source of the crude material, and in this vat it is again precipitated and eventually recovered.

By the means above described, I am enabled to cheaply produce a crude material from which potassium chlorid can be more economically recovered than from carnalite. My method also makes possible the recovery of potassium chlorid from this crude material without vaporization by artificial heat, this desirable result being attained by providing the simple method herein described for controlling the temperature range and the magnesium chlorid content of the circulating liquor.

Having thus described my invention, what I claim and desire to secure by Letters Patent is:

1. The method of recovering potassium chlorid from brine containing principally potassium, sodium and magnesium chlorids, which consists in producing by solar evaporation crude crystalline material richer in potassium chlorid than the brine, dissolving the potassium chlorid contents of said material by means of heated solvent to form a hot saturated potassium chlorid solution containing so small a proportion of magnesium chlorid that upon cooling potassium chlorid will precipitate without the precipitation of sodium chlorid, separating while hot the said potassium-saturated solution from the undissolved solids, cooling said potassium-saturated solution and depositing potassium chlorid, removing the potassium chlorid, also removing a portion of the cold mother liquor, adding make-up liquor containing a less percentage of magnesium chlorid than contained in the removed cold mother liquor, whereby to produce a solution which after being heated and mixed with a further supply of crude crystalline material will contain so small a proportion of magnesium chlorid that upon cooling it will not precipitate sodium chlorid, heating the combined mother liquor and make-up liquor to form a hot solvent and adding thereto a new supply of said crystalline material.

2. The method of recovering potassium chlorid from brine containing principally potassium, sodium and magnesium chlorids, which consists in producing by solar evaporation crude crystalline material richer in potassium chlorid than the brine, dissolving the potassium chlorid contents of said material by means of heated solvent to form a hot saturated potassium chlorid solution containing so small a proportion of magnesium chlorid that upon cooling potassium chlorid will precipitate without the precipitation of sodium chlorid, separating while hot the said potassium-saturated solution from the undissolved solids, cooling said potassium-saturated solution and depositing potassium chlorid, removing the potassium chlorid, also removing a portion of the cold mother liquor and recovering the potassium chlorid content thereof by evaporation, adding make-up liquor containing a less percentage of magnesium chlorid than contained in the removed cold mother liquor, whereby to produce a solution which after being heated and mixed with a further supply of crude crystalline material will contain so small a proportion of magnesium chlorid that upon cooling it will not precipitate sodium chlorid, heating the combined mother liquor and make-up liquor to form a hot solvent and adding thereto a new supply of said crystalline material.

3. A method of recovering potassium chlorid from brine containing principally potassium, sodium and magnesium chlorids, which consists in producing by solar evaporation a crude crystalline substance containing sodium chlorid and a higher per cent. of potassium chlorid than was contained in the original brine, adding to said crude material sufficient hot liquor to entirely dissolve the potassium chlorid, and to thereby form a solution saturated with respect to potassium chlorid and containing so small a proportion of magnesium chlorid that the solution upon cooling will deposit potassium chlorid, but when cold will dissolve rather than deposit sodium chlorid, separating the resulting saturated solution from the undissolved sodium chlorid while hot, cooling said solution and depositing potassium chlorid, removing the potassium chlorid, also removing a portion of the cold mother liquor and replacing said removed portion with a sufficient quantity of liquor containing less magnesium chlorid, whereby to produce when heated and mixed with crude potassium chlorid salts, a solution containing so small a proportion of magnesium chlorid that the solution upon cooling will dissolve rather than deposit sodium chlorid, re-heating said solution and mixing it with a new supply of crude potassium chlorid salts, and recovering from said removed portion of mother liquor the potassium chlorid content thereof.

4. Producing by solar evaporation from brine containing principally potassium, sodium and magnesium chlorids, a crude crystalline substance containing sodium chlorid and a higher per cent. of potassium chlorid than was contained in the original brine, adding to said crude material sufficient hot liquor to entirely dissolve the potassium chlorid, thereby forming a potassium chlorid solution which contains less than one-hundred-fifty grams magnesium chlorid per one-thousand grams of water, separating the resulting liquor from the undissolved sodium chlorid while hot; cooling said liquor and depositing potassium chlorid, removing the potassium chlorid so produced, removing a portion of the cold mother liquor and replacing said removed portion with a sufficient quantity of make-up solution containing a less proportion of magnesium chlorid, whereby to produce when heated and mixed with the crude potassium chlorid salts, a solution containing a proportion of magnesium chlorid so small that said solution upon being cooled will deposit practically no sodium chlorid with the potassium chlorid, but will tend to dissolve any solid sodium chlorid present.

5. A method of recovering potassium chlorid from brine containing principally potassium, sodium and magnesium chlorids, which consists in producing by solar evaporation a crude crystalline substance containing sodium chlorid and a higher per cent. of potassium chlorid than was contained in the original brine, adding to said crude material sufficient hot liquor to entirely dissolve the potassium chlorid, thereby forming a potassium chlorid solution which contains less than one-hundred-fifty grams magnesium chlorid per one-thousand grams of water, separating the resulting liquor from the undissolved sodium chlorid while hot; cooling said liquor and depositing potassium chlorid, freeing the potassium chlorid so produced from the mother liquor, removing a portion of the cold mother liquor and replacing said removed portion with a sufficient quantity of make-up solution containing less magnesium chlorid, to produce when mixed with the crude potassium chlorid salts, a solution containing less than one-hundred-fifty grams of magnesium chlorid per one-thousand grams of water, re-heating said liquor and mixing it with a new supply of crude potassium chlorid salts.

6. In a method of recovering potassium chlorid from brine containing principally potassium, sodium and magnesium chlorids; producing by solar evaporation a crude crystalline substance containing sodium chlorid and a higher per cent. of potassium chlorid than was contained in the original brine, adding to said crude material sufficient hot liquor to entirely dissolve the potassium chlorid, thereby forming a potassium chlorid solution which contains less than one-hundred-fifty grams magnesium chlorid per one-thousand grams of water, separating the resulting liquor from the undissolved sodium chlorid while hot; cooling said liquor and depositing potassium chlorid and removing the potassium chlorid so produced.

7. The method of recovering crude potassium-bearing material from brines containing chlorids of sodium, potassium and magnesium, which consists in evaporating the brine at atmospheric temperatures by means of solar heat until the brine is nearly saturated with respect to potassium chlorid, freeing the concentrated solution from the precipitated sodium chlorid, further evaporating the concentrated solution at atmospheric temperature until the solution is nearly saturated with respect to magnesium chlorid, thereby precipitating a mixed salt consisting of sodium-potassium chlorids, and a sodium-potassium-magnesium chlorid, and freeing the precipitated salts from the residual liquor.

8. The method of recovering crude potassium-bearing material from brines of the character described, containing chlorids of sodium, potassium and magnesium, which consists in evaporating the brine at atmospheric temperatures until it is nearly saturated with respect to potassium chlorid, freeing the concentrated solution from the precipitated sodium chlorid, further evaporating the concentrated solution at atmospheric temperatures to precipitate mixed chlorids of sodium and potassium, without precipitation of salts containing magnesium, and freeing the precipitated potassium-sodium salts from the residual liquor.

In testimony whereof I affix my signature.

JOSEPH L. SILSBEE.